(12) United States Patent
Jung et al.

(10) Patent No.: US 10,307,700 B2
(45) Date of Patent: Jun. 4, 2019

(54) CONTAMINATION INDICATOR

(71) Applicant: Hydac Filtertechnik GmbH, Sulzbach/Saar (DE)

(72) Inventors: Artur Jung, Quierschied (DE); Jörg Michael Wendels, Riegelsberg (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 89 days.

(21) Appl. No.: 14/628,328

(22) Filed: Feb. 23, 2015

(65) Prior Publication Data

US 2015/0298034 A1 Oct. 22, 2015

(30) Foreign Application Priority Data

Apr. 16, 2014 (DE) .......... 10 2014 005 638
Oct. 4, 2014 (DE) .......... 10 2014 014 730

(51) Int. Cl.
*G01L 19/12* (2006.01)
*B01D 35/143* (2006.01)

(52) U.S. Cl.
CPC ................ *B01D 35/143* (2013.01)

(58) Field of Classification Search
CPC .. B01D 35/143; B01D 29/606; B01D 33/808; B01D 35/1435; B01D 37/046; F16K 37/0025
USPC ................ 137/67, 72; 210/87, 90
See application file for complete search history.

(56) References Cited

U.S. PATENT DOCUMENTS

| | | | | |
|---|---|---|---|---|
| 2,669,707 A * | 2/1954 | Ehrman | ............... | B01D 35/143 116/267 |
| 2,979,021 A * | 4/1961 | Scavuzzo | ............. | B01D 35/143 116/268 |
| 3,080,972 A * | 3/1963 | Smith | ............... | B01D 35/143 116/273 |
| 3,117,550 A * | 1/1964 | Cole | .................... | B01D 35/143 116/220 |
| 3,262,565 A * | 7/1966 | Silverwater | ........... | B01D 29/21 210/90 |
| 4,316,801 A * | 2/1982 | Cooper | ................ | B01D 35/143 210/133 |
| 4,651,670 A * | 3/1987 | Silverwater | ............. | G01L 19/12 116/267 |
| 5,188,728 A * | 2/1993 | Traonvoez | ........... | B01D 35/143 116/267 |
| 5,653,191 A * | 8/1997 | Calhoun | ................. | A62B 7/02 116/272 |

(Continued)

FOREIGN PATENT DOCUMENTS

GB 887963 1/1962

*Primary Examiner* — Angelisa L. Hicks
(74) *Attorney, Agent, or Firm* — Wenderoth, Lind & Ponack, L.L.P.

(57) ABSTRACT

A contamination indicator is for filter elements (12) for fluids that are replaceably housed in a filter housing (2). The indicator has a fluid-conveying connection (58) to the interior of the housing (2) and possesses an indicating device (52) providing information concerning the degree to which the filter element is contaminated (12). A temperature-dependently active actuation device (50) is connected upstream from the indicating device (52) in the direction of fluid inlet. By the actuation device, the indicating device (52) is activated when the fluid temperature has reached a predefinable threshold value.

19 Claims, 8 Drawing Sheets

(56) References Cited

U.S. PATENT DOCUMENTS

| | | | |
|---|---|---|---|
| 2005/0186087 A1* | 8/2005 | Koide | F04B 27/1009 |
| | | | 417/269 |
| 2008/0072857 A1* | 3/2008 | Sailer | F01L 1/24 |
| | | | 123/90.55 |
| 2013/0008839 A1* | 1/2013 | Wilkendorf | B01D 35/06 |
| | | | 210/90 |

* cited by examiner

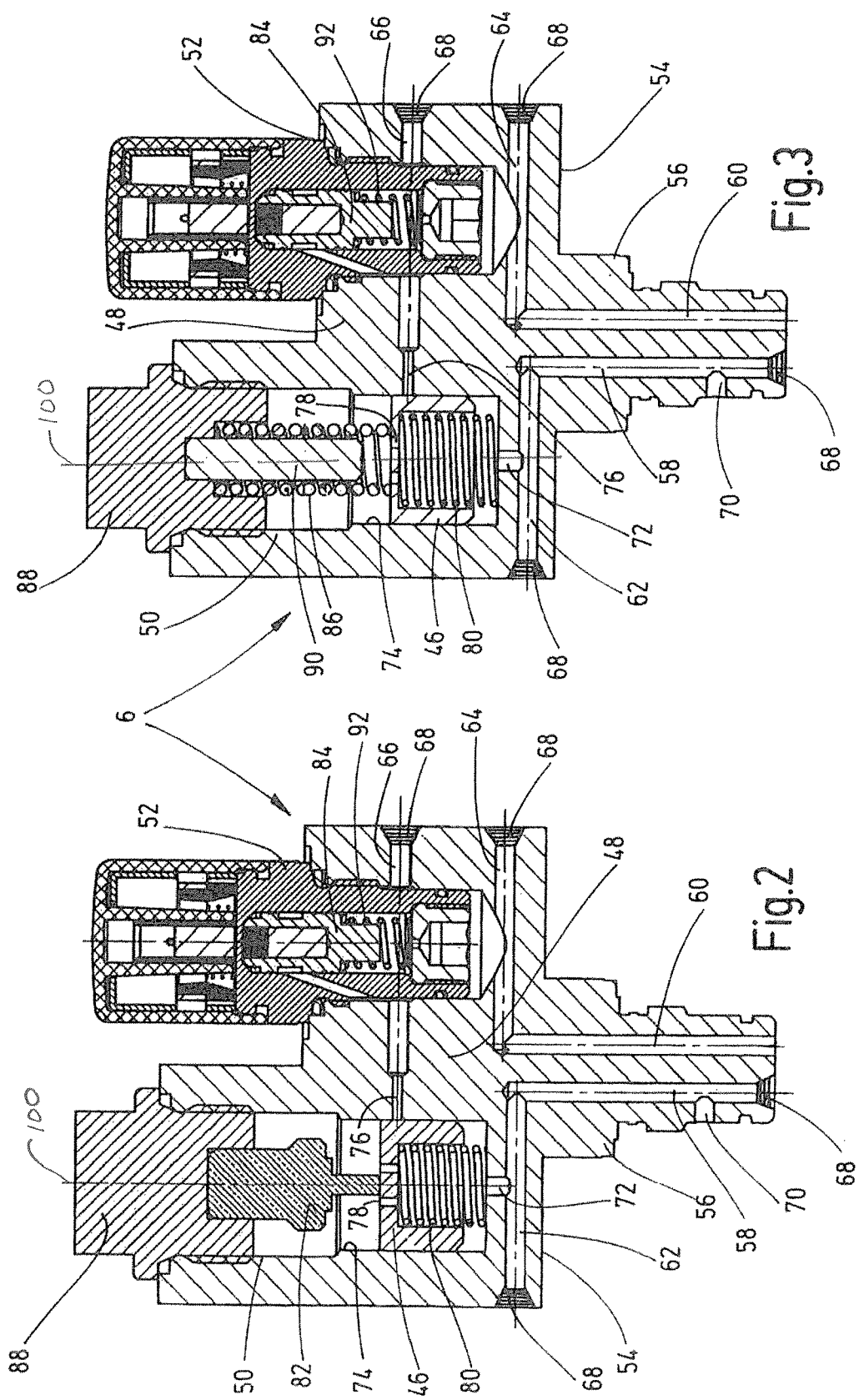

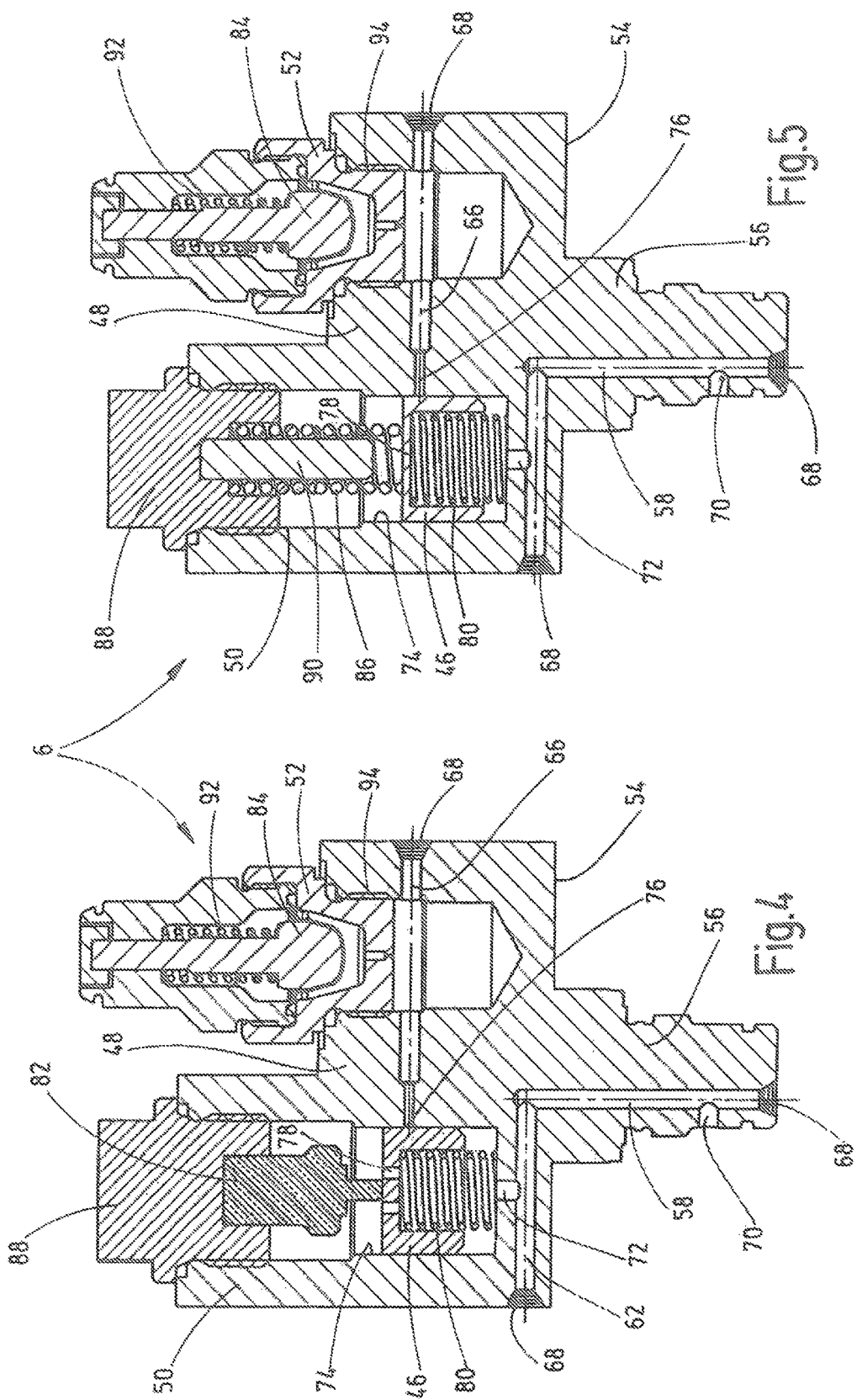

CONTAMINATION INDICATOR

FIELD OF THE INVENTION

The invention relates to a contamination indicator for filter elements for fluids that are replaceably housed in a filter housing. The indicator has a fluid-conveying connection to the interior of the housing and possesses an indicating device. The indicator device provides information concerning the degree to which the filter element is contaminated.

BACKGROUND OF THE INVENTION

Contamination indicators of this type are known in the prior art (DE 101 27 021 C1) and are used in hydraulic systems, in which replacement of used filter elements located in the fluid circuit with new filter elements is necessary once a certain degree of contamination has entered to maintain the operational reliability of the system. The known manner in which such contamination indicators function is based on the fact that an increase in pressure in the fluid intake (i.e., the dirty side in the filtering process) is associated with increasing contamination of the filter element. Accordingly, such contamination indicators function based on the fact that these indicators have a movable element such as a plunger or membrane. The plunger or membrane is acted upon by pressure on the dirty side. The deflection of that element provides an indication of the degree to which the filter element is contaminated.

If a hydraulic system is put into operation in a cold state, risk exists that the indicating device of the contamination indicator will signal a degree of contamination that falls below a threshold value that has been predefined as acceptable. This indication is due to the fact that the flow resistance of the filter element is a function of the viscosity of the fluid in the hydraulic oil and the viscosity, in turn, is largely a function of the fluid temperature. In the case of a cold start-up and during the cold phases before reaching the normal operating temperature, which may be in the range of 40° C. for example, the pressure that arises on the dirty side will then signal an insufficient degree of contamination.

SUMMARY OF THE INVENTION

An object of the invention is to provide an improved contamination indicator of the above mentioned type, in which the display errors due to temperature-induced changes in the viscosity of the fluid are minimized.

This object is basically achieved according to the invention by a contamination indicator where a temperature-dependently active actuation device is connected upstream from the indicating device in the direction of fluid inlet. That actuation device activates the indicating device when the fluid temperature has reached a predefinable threshold value. The indicating device does not generate a signal before reaching the predetermined operating temperature so that the contamination indicator functions as desired, in a temperature-dependent manner.

A differential pressure indicator that detects the pressure differential prevailing in the filter element during operation may be provided as an indicating device. The pressure of the clean side of the filter element is supplied to the indicating device as an active component. When the actuation device is active by the indicator, the pressure of the dirty side is supplied as a countering active component. The measured value of the pressure differential, which represents the contamination-dependent flow resistance of the filter element, can be optically, electrically or acoustically signaled by an indicating device according to the prior art. DE 101 27 021 C1 discloses an example of such a differential pressure indicator device, which generates an electrical measurement signal. A differential pressure indicator from the VD Series sold by Hydac International GmbH can be provided as an optical display, for example, the indicator having the product designation VD2 B1 for a response pressure of 0.8 bar.

Alternatively, a back pressure indicator may be provided as an indicating device, to which the pressure of the dirty side of the filter element can be supplied via the active actuation device as an active component that counters the static ambient pressure.

In an especially advantageous manner, the actuation device may have a valve device having a movable closing body. The closing body is pretensioned in a closed position that blocks the fluid inlet to the indicating device, and can be moved into an open position that releases the fluid inlet by a temperature-dependently active positioning device associated with the valve device.

In especially advantageous embodiments, the positioning device provided to actuate the actuation device has a expansion element connected upstream from the closing body in the direction of fluid inlet. The expansion element comes into contact with fluid and is coupled with the closing body in such a way that this closing body can be moved into the open position through the thermal expansion of the expansion element. Due to the fact that the expansion element comes into contact with fluid in such a way, an efficient thermal coupling between the fluid and the expansion element is implemented in the simplest manner. The contamination indicator according to the invention is thereby distinguished by a significantly improved measurement precision as compared to currently available contamination indicators according to the prior art, in which an external thermostat is provided, for example such as that disclosed in DE 66 01 591 U, with the aim of preventing an electric signal from being emitted during cold-start conditions. Since the bimetallic spring of the thermostat in this prior art solution is located outside of the fluid area, the display is strongly influenced by the temperature of the surrounding air, and accordingly, is inaccurate. Due to the far better thermal connection between the fluid and the expansion element provided in the invention, the precision of the indicating device according to the invention is thus far better.

In an especially advantageous manner, the closing body of the actuation device may be formed by a spool. The spool is guided in a valve cylinder that forms a part of the fluid inlet, and can be shifted into the open position by an expansion of the expansion element.

In the open position the spool releases an outlet of the valve cylinder that leads to the indicating device. The pressure signal on the indicating device thereby becomes active.

In advantageous embodiments, an expanding body may be provided as an expansion element in the valve cylinder. The expanding body is supported on one side on the spool, and on the other side on an end part of the valve cylinder. Alternatively, a spring formed out of a metal alloy having shape memory may be provided as an expansion element. The spring expands to a greater length upon heating, and is supported on one side on the spool and on the other side on an end part of the valve cylinder. In both cases, in the case of the mechanical coupling provided according to the invention, a simple, operationally reliable and especially compact design can be implemented between the expansion element and spool for the actuation device.

Advantageously, the valve cylinder of the actuation device is formed in a valve block, in which the indicating device in the form of an insert is housed, and in which inner fluid connections are formed for the respective fluid inlets. The contamination indicator, including the indicating device, and the actuation device, including its temperature-dependent positioning device, are thereby consolidated into a compact assembly in the form of an adapter, which adapter can be affixed to a corresponding filter housing.

To this end, the valve block may advantageously have a connecting port, which can be screwed into a connecting bore of the head section of the appropriate filter housing, and which has at least one inner fluid passage. As part of the fluid inlet to the actuation device, the connecting port forms the fluid-conveying connection to the interior of the filter housing via the connecting bore of the head section.

In a modified embodiment, the valve device of the actuation device has a seat valve. The closing body of the seat valve abuts a valve seat under the pretensioning of a closing spring. Because a valve that can close without leaks is provided, increased reliability against an indication error under cold-start conditions is ensured. In the case of other valve designs such as spool valves, a leakage, albeit a small degree of leakage, after a specific period of time, may trigger an indication of contamination. The complete sealing off of the feed to the indicating device also continues during prolonged cold-start phases until the fluid has reached the desired temperature.

In especially advantageous embodiments, the seat valve is disposed in a valve housing. The valve housing has a fluid channel in the form of a stepped bore that extends axially through this housing. In the fluid channel fine steps form the valve seat for a valve ball of the seat valve. This design of the seat valve in the form of a ball valve can be implemented with a valve housing having a small installation size at little expense.

In terms of the design of the valve housing, this housing may have a connection part on the input side of the stepped bore to form a fluid connection to the dirty side of the filter element. A spring formed out of a metal alloy having shape memory is provided as an expansion element in the end section of the bore adjacent to the connection part. The spring expands to a greater length when heated, is supported on one side on the end piece, and transmits a dynamic force against this closing force on the valve ball with its other end upon heating.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 2 is a side view in section of the separately depicted contamination indicator of FIG. 1 drawn in a larger scale than that used in FIG. 1;

FIG. 3 is a side view in section of a contamination indicator with a modified exemplary embodiment of the actuation device;

FIG. 4 is a side view in section of a contamination indicator with the actuation device of FIG. 2 and with an exemplary embodiment of the indicating device that is modified relative to the device shown in FIGS. 2 and 3;

FIG. 5 is a side view in section of a contamination indicator with the indicating device of FIG. 4 and the actuation device of FIG. 3;

DETAILED DESCRIPTION OF THE INVENTION

Figure 1:
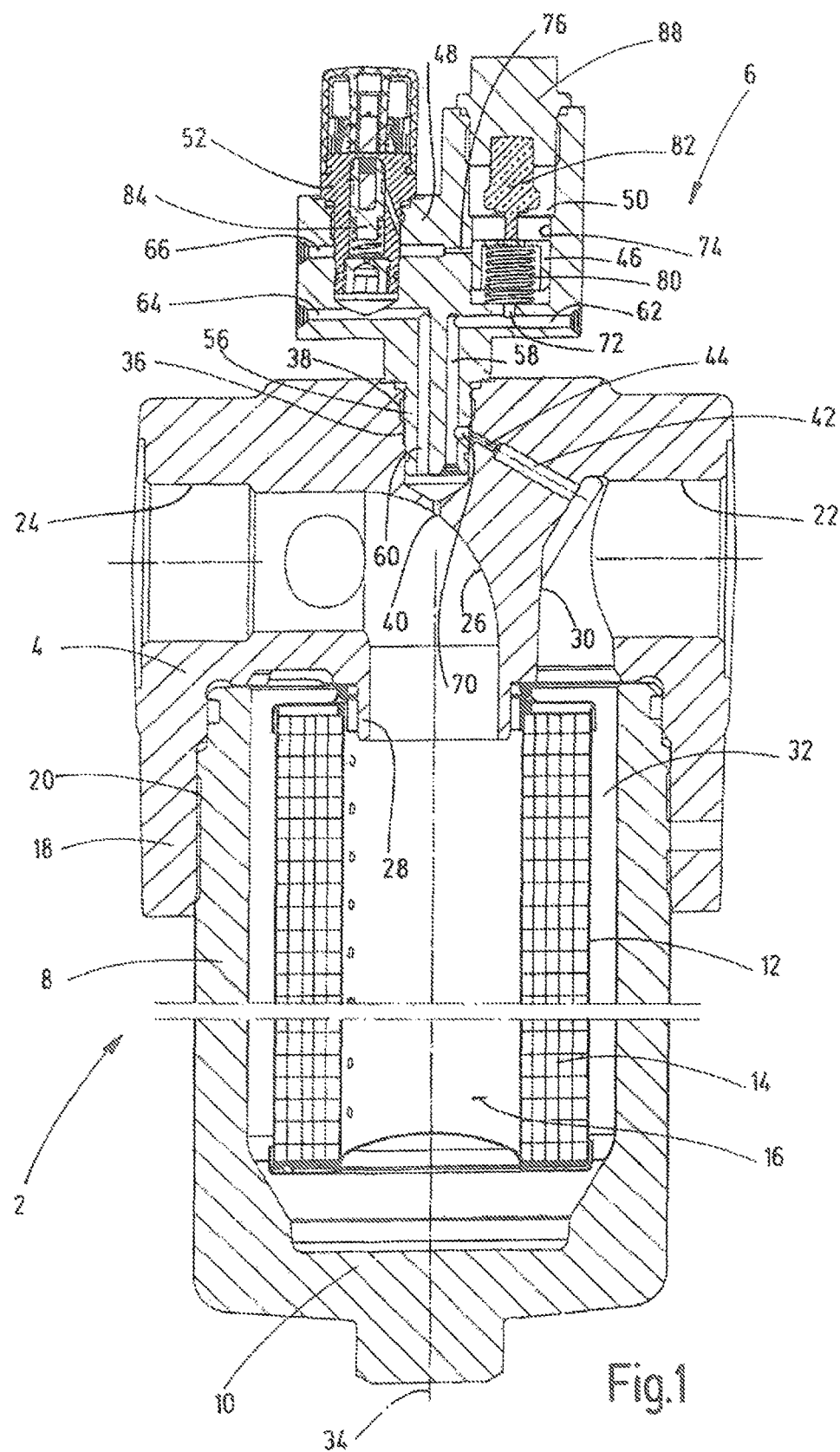
FIG. 1 is a side view in section of a shortened illustration of a filter housing that is equipped with a contamination indicator according to an examplary embodiment of the invention.

In FIG. 1 a filter housing 2 has an adapter with a contamination indicator 6 has been attached to the removable filter head 4 of the housing. The filter housing 2 has a circular cylindrical filter bowl 8 with a closed bottom 10. A replaceable filter element 12 can be housed in the bowl 8. The filter element is formed in a known manner and has a filter material 14 that forms a hollow cylinder. Fluid can pass through the filter material from the outside into an inner filter cavity 16 during operation. The filter head 4, which seals the upper, open end of the filter bowl 8, has a connection part 18 that overlaps the upper opening edge of the bowl 8, with which the head 4 can be connected with the bowl 8 by a thread 20. The filter head 4 can be removed for inserting and exchanging a filter element 12.

The filter head 4 has ports, which form a fluid inlet 22 and a fluid outlet 24. A fluid passage 26 is connected to the fluid outlet 24 and opens into the inner filter cavity 16 via a connecting port 28. The fluid passage 26 thus forms the clean side in the filter head 4 during the filtering process. A fluid passage 30 connects to the fluid inlet 22 and opens into the chamber 32 located on the exterior of the filter material 14. The fluid passage 30 forms the dirty side during the filtering process.

A connecting bore 36 having an inner thread 34 is formed in the upper side of the filter head 4 such that it is coaxial to the longitudinal axis 34. At the bottom of the connecting bore 36, this bore passes from a highly tapered bore end section 40 into the fluid passage 26, which forms the clean side. At approximately half the length of the connecting bore 36, bore 36 opens into an access channel 42 having a highly tapered canal end section 44. The access channel 42 extending from the connecting bore 36 is at an angle to the fluid passage 30, which forms the dirty side during operation.

The adapter with a contamination indicator 6, which is shown separately in FIG. 2, has a valve block 48, in which an actuation device 50 and an indicating device 52 are integrated in an assembly in the manner of an adapter. On the connection side 54 located at the bottom in the drawing, the valve block 48 has a centrally located connecting port 56, which can be screwed into the connecting bore 36 in the filter head 4. Bores are formed in the valve block 48 to form fluid inlets. A bore 58 and 60 extends from each of these in the connecting port 56 parallel to the axis. A transverse bore 62 that is connected to the bore 58, and a transverse bore 64 that is connected to the bore 60 extend in the valve block 48 perpendicular to these bores. A transverse bore 66 extends above the transverse bores 62, 64 and parallel thereto. The outer ends of the bores 58, 62, 64 and 66 are each closed by a conical plug 68. The bore 60 in the connecting port 56 is open at the free end of the connecting port 56. The other bore 58 that extends in the connecting port opens into a transverse channel 70 on the side of the connecting port 56. In the case of a valve block 48 that is screwed into the filter head 4, the bore 58 is in fluid communication with the access channel 42 via the transverse channel 70 on the connecting port 56 and via the end part 44 of the channel. Thus, the transverse bore 62 forms the fluid inlet, which regulates the pressure on the dirty side. On the other side, the bore 60 in the connecting port 56 is in communication at the free end thereof with the fluid connection 26 via the bore end 40 of the connecting bore 36, and therefore regulates the pressure on the clean side, which pressure also prevails at the transverse bore that is connected to the bore 60.

The transverse bore 62 opens into a valve cylinder 74 of the actuation device 50 via a junction 72. A valve spool 46 is guided in the valve cylinder 74 such that it can slide, which valve spool blocks an outlet 76 out of the valve cylinder 74 in the case of the spool position shown in FIG. 2. In the closed position shown in FIG. 2, the spool 46, which has an inner bore 78 that allows a passage of fluid, is pretensioned by a spring 80 in such a way that the spool 46 rests against a facing end of an expansion body 82. The other end of expansion body 82 is held at an end part 88 of the valve cylinder 74. The outlet 76 of the valve cylinder 74 is in fluid communication with the transverse bore 66, which in turn forms the connection to a plunger side of a plunger 84. Pluger 84 forms the control element of the indicating device 52 and is pretensioned in an end position by a spring 92. The other plunger side of the plunger 84 of the indicating device 52 is in fluid communication with the transverse bore 64 and therefore is subjected to the pressure of the clean side of the filtering process.

In this configuration, the expansion body 82 in the valve cylinder 74, which has been provided as an expansion element, is in contact with the fluid that conveys the pressure of the dirty side via the transverse bore 62, the junction 72 and the bores 78 in the spool 46. The expansion of the expansion body 82, which is dependent on the temperature of the fluid, moves the spool 46 downward against the force of the spring 80 in FIG. 2 when the fluid temperature has reached a predefined threshold value with the expansion element 82 expanding and the closing body or spool 46 moving axially along their longitudinal axis 100. Upon reaching a predefined temperature, the outlet 76 is released, and the pressure signal of the dirty side is fed via the transverse bore 66 of the indicating device 52. Since the pressure of the clean side is simultaneously exerted on the plunger 84 of the device through the bore 64, the indicating device 52 functions as a differential pressure indicator. As mentioned, an indicating device of a known type that provides an optical, electrical or acoustic signal may be used as the indicating device 52 so that it not be discussed in detail here.

The embodiment in FIG. 3 corresponds to the example in FIG. 2, with the exception that the expansion element is not formed by an expansion body 82 but rather by a spring 86 formed out of a metal alloy having shape memory. That spring 86 can be formed out of a nickel-titanium-copper alloy in a known manner such that it expands to a greater length upon heating, and thus, behaves like the expansion body 52. The spring 86 that is clamped between the spool 46 and the end part 88 of the valve cylinder 50 is such a spring, so that the mode of operation of the example in FIG. 3 corresponds to that of the example in FIG. 2. In so doing, the spring 86 is guided onto a pin 90, which is anchored in the end part 88 and which extends coaxially in the valve cylinder 74. The spring 86 extends along and expands axially along its longitudinal axis 100 to move the closing body axially along its longitudinal axis 100.

The embodiment in FIG. 4 provides the same design of the actuation device 50 with an expansion body 82 as that in the embodiment in FIG. 2. The difference is that no differential pressure indicator is provided, but rather a back pressure indicator is provided as an indicating device 52, which, in the case of an activated actuation device 50, signals the pressure of the dirty side relative to the static pressure of the environment. For this reason, when the actuation device 50 is active, the plunger 84, which serves as an indicator element and which is loaded by a spring 92, is only subjected to the pressure of the dirty side via the transverse bore 66. The transverse bore 64 provided in the valve block 48 for the differential pressure indicator in the examples in FIGS. 1 to 3 is omitted here, as is the bore 60 in the connecting port 56.

The embodiment in FIG. 5 corresponds to that in FIG. 4, with the exception that in the case of the actuation device 50, instead of an expansion body 82, an expansion element, in the form of a spring 86 made out of a metal alloy having shape memory is provided. As in the example in FIG. 4, the indicating device 52 is again designed as a back pressure indicator, which, as in FIG. 4, is screwed into the valve block 48 as a threaded insert by a thread 94.

Figure 6:
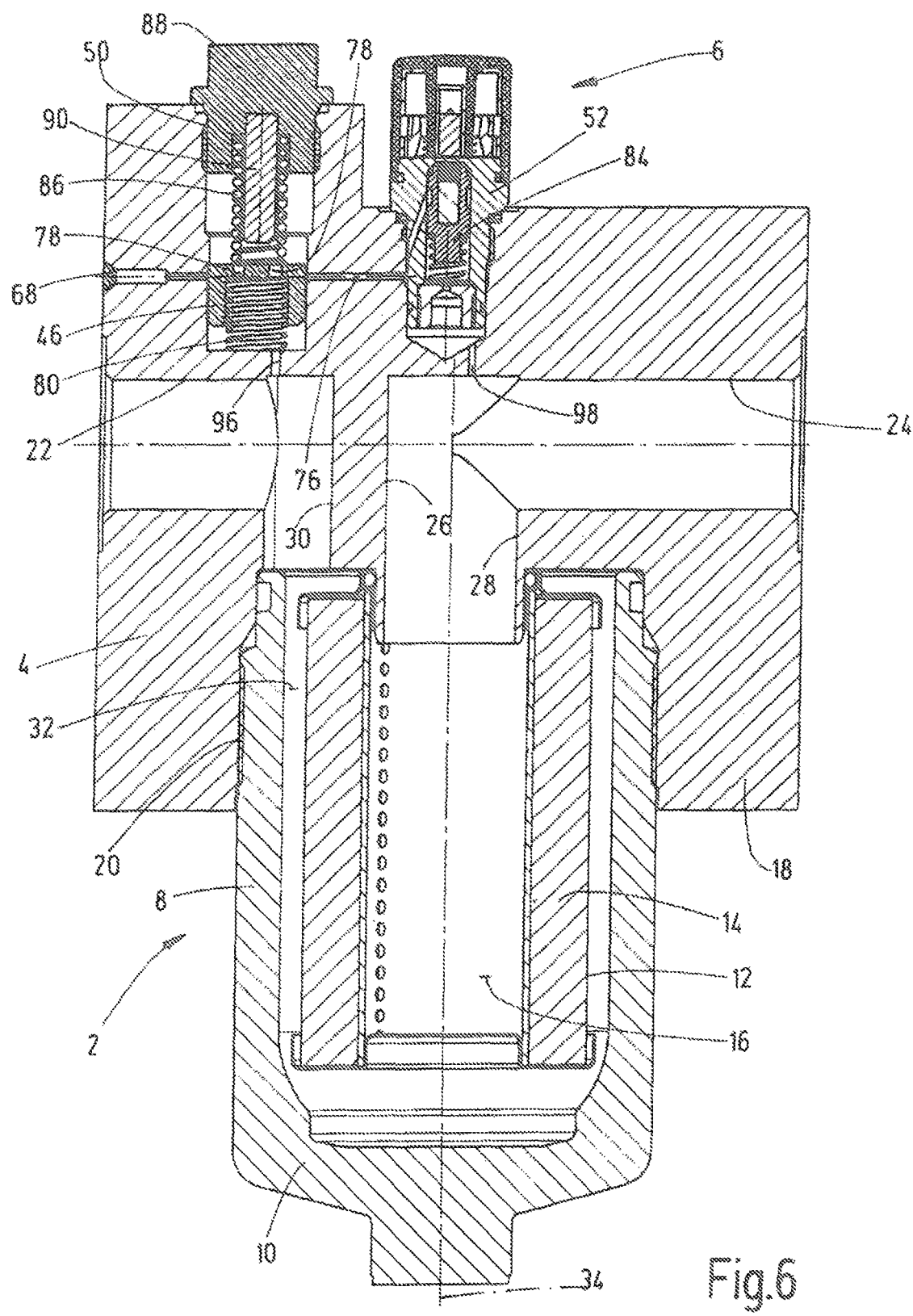
FIG. 6 is a side view in section of a filter housing which the contamination indicator of FIG. 3 incorporated directly in the filter head.

FIG. 6 shows an embodiment in which the contamination indicator 6, which corresponds to the embodiment in FIG. 3, is not designed as an adapter that can be screwed in. Rather, the contamination indicator is directly integrated into the filter head 4 of the filter housing 2. The indicating device 50 is in communication with the fluid connection 30 at the fluid inlet 22 via a channel 96 in the filter head 4. A channel 98 connects the indicating device 52 to the fluid passage 26 at the fluid inlet 24.

Figure 7:
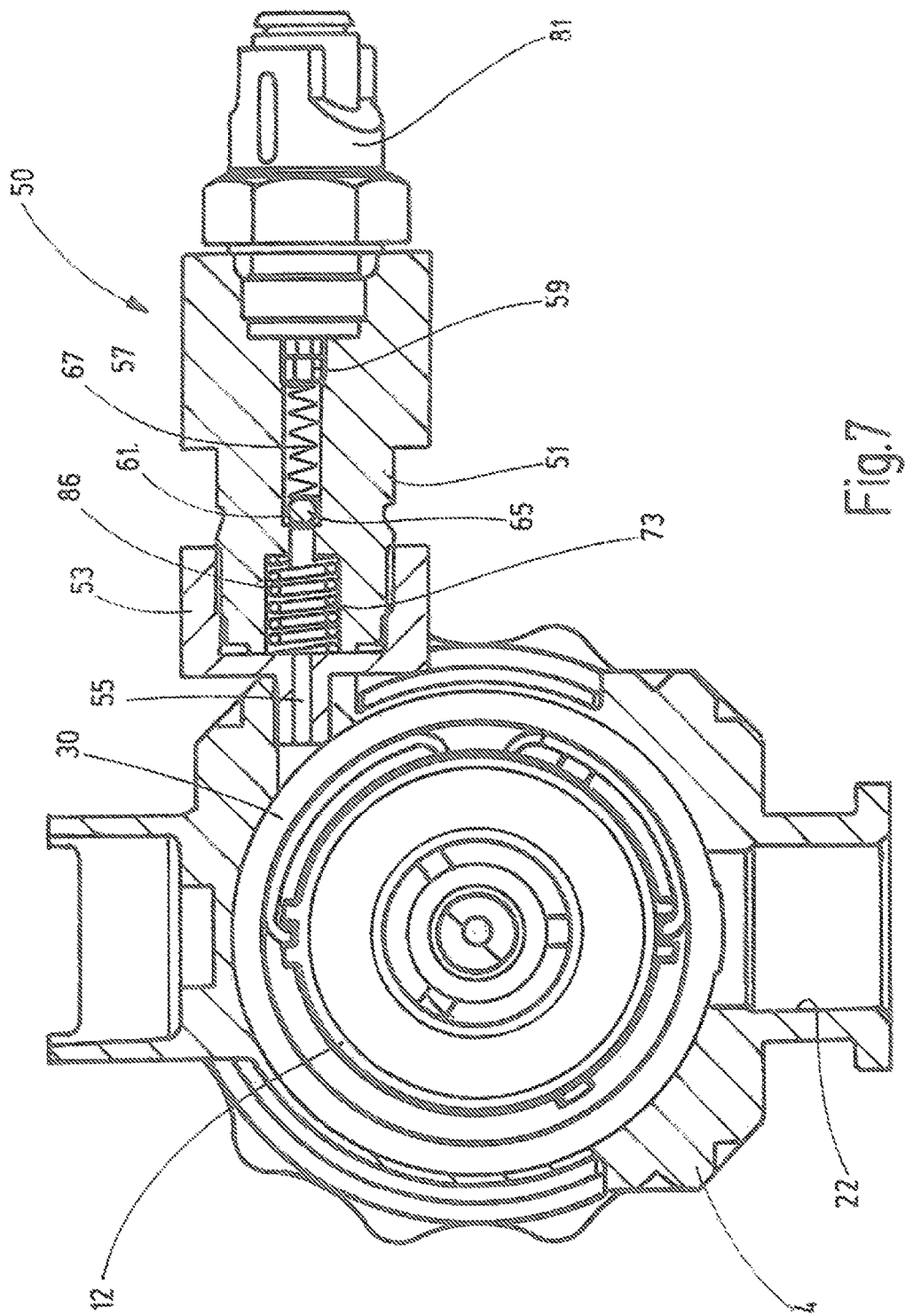
FIG. 7 is a plan view in section of a filter housing in the region of the filter head, provided with an adapter in the form of a modified exemplary embodiment of the contamination indicator according to the invention.
Figure 8:
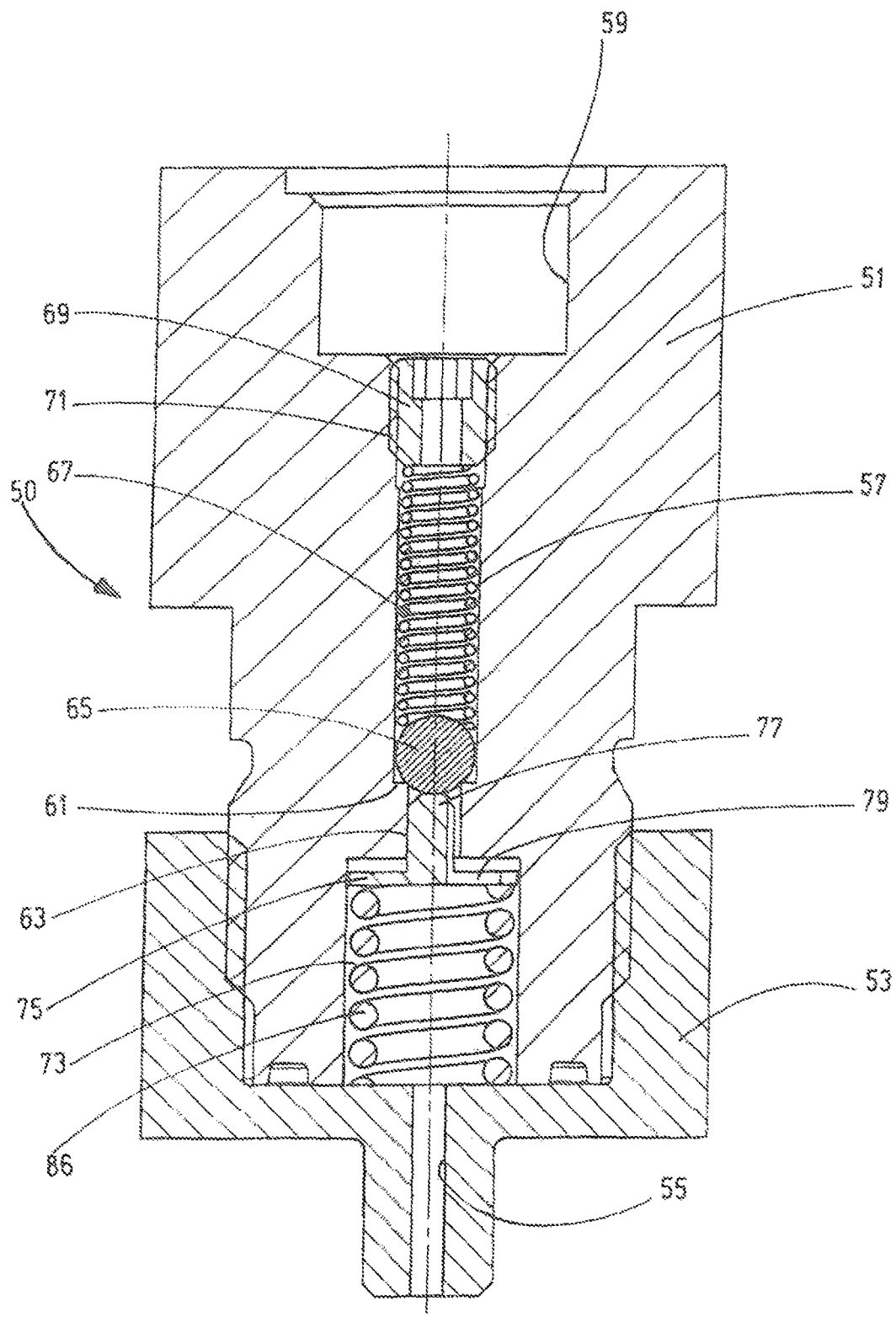
FIG. 8 is a side view in section of just the valve housing of the adapter of FIG. 7 that is enlarged as compared to FIG. 7, wherein the valve device is shown in the closed position.
Figure 9:
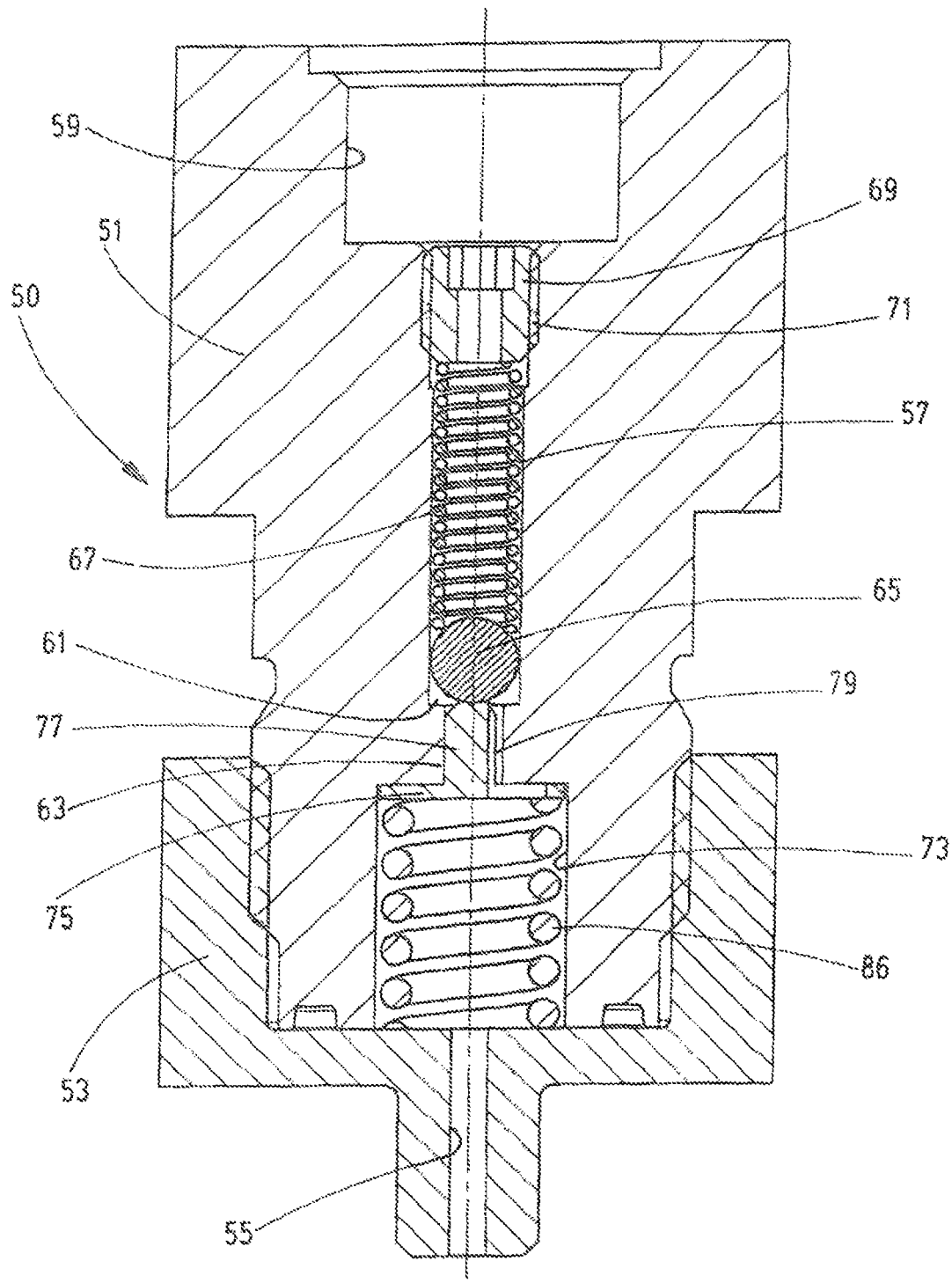
FIG. 9 is a side view in section of the valve housing of FIG. 8 showing the valve device in the open position.
Figure 10:
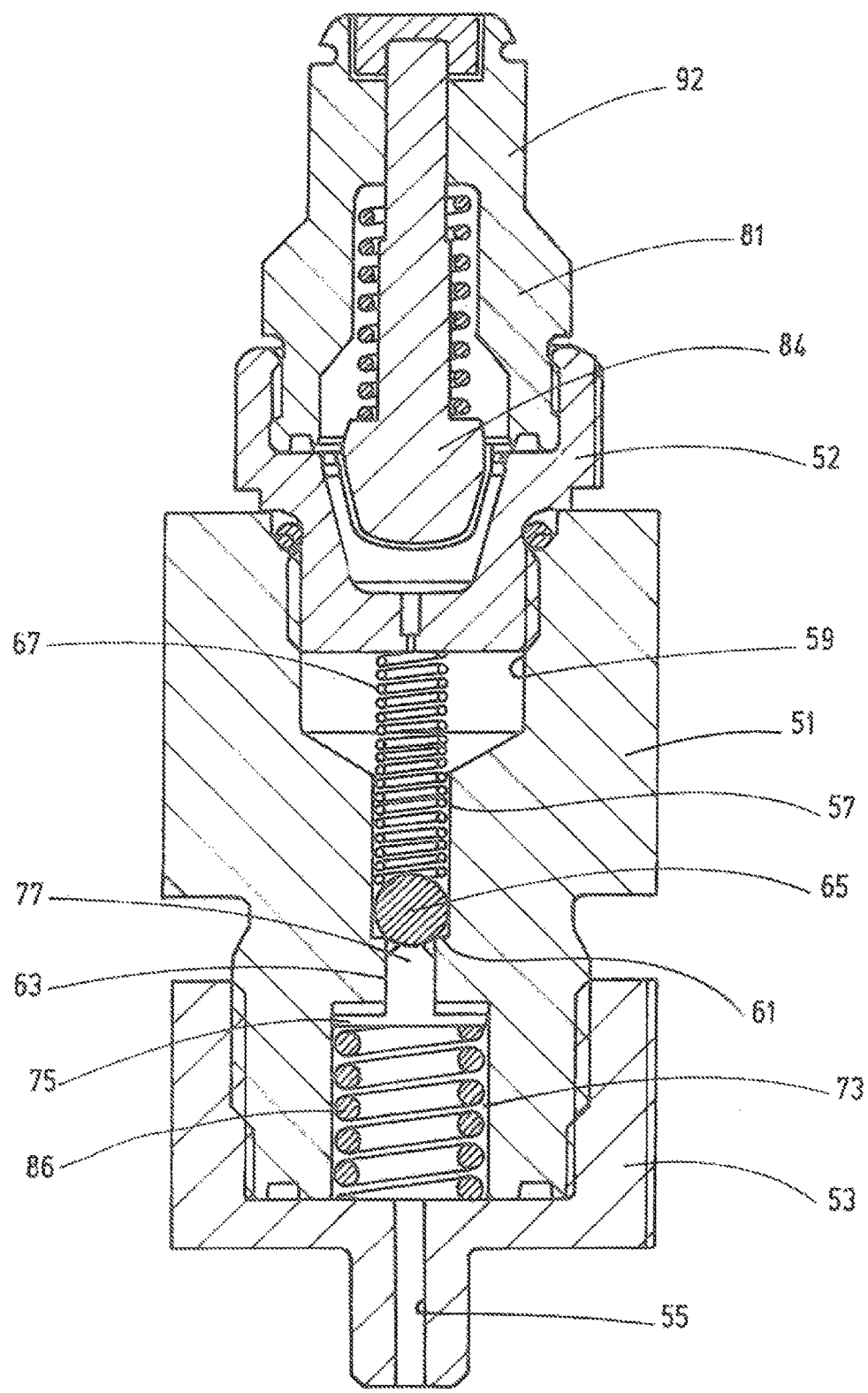
FIG. 10 is a side view in section, enlarged as compared to FIG. 7, of the FIG. 7 adapter, which is equipped with a back pressure indicator.

FIGS. 7 to 10 show a modified embodiment of the actuation device 50 in the form of an adapter having a valve housing 51 having a connection part 53 at one end. With connection part 53, the housing 51 can be screwed together with the head section 4 of the filter housing 2. The connection part 53 forms a fluid connection 55 to the dirty side 30 of the filter element 12. The valve housing 51 has a fluid channel in the form of a stepped bore 57, which extends from the connection part 53. The connection part 53 is formed by a screw cap. The stepped bore 57 to the outlet end 59 of the valve housing 51 is in an axial direction throughout. In the stepped bore 57, a step 61 at the transition to a narrowed section of the bore 63 forms a valve seat for a ball 65, which forms the closing body of a seat valve in the form of a ball valve. The valve ball 65 is pretensioned in the closed position, as shown in FIGS. 7, 8 and 10, by a closing spring 67. Spring 67 is located in the bore segment that extends from the valve seat 61 to the outlet end 59 and is supported at the end facing away from the ball 65 on a hollow adjustment screw 69. Screw 69 is located in a threaded section 71 on the bore 57 and enables an adjustment of the pretensioning of the seat valve.

Between the connection part 53 and the narrowed section of the bore 63, the stepped bore 57 has bore section 73 that has an expanded diameter. A spring 86 is located in bore section 73 as an expansion element and expands in length upon heating, as is also provided in the embodiments in FIGS. 3, 5 and 6. The spring 86 is supported on one side on the connection part 53 and on the other side on an actuation part 75. The actuation part 75 can be moved in the bore section 73 and has a tappet 77. Tappet 77 extends through the narrowed bore section 63 to the valve ball 65. The actuation part 75 with the tappet 77 has a recess 79 as a fluid passage to the valve ball 65.

FIG. 9 shows the status of the valve when the spring 86 has been heated. The actuation part 75 is moved by the tappet 77 so that the ball 65 is lifted from the valve seat 61. Since the valve ball 75 has an outer diameter that is somewhat smaller than the inner diameter of the adjacent bore section, the fluid path from the fluid connection 55 on the inlet side to the outlet end 59 is free to trigger a corresponding signal. In FIGS. 7 and 10, an indicating device 52 in the form of a back pressure indicator 81 is connected at the outlet end 59 as a screw-on part, as is also the case in the embodiments in FIGS. 4 and 5. As is the case with the embodiments in FIGS. 1, 2 and 6, a differential pressure indicator could likewise be provided. As in the above mentioned embodiments, a differential pressure connection to the clean side of the filter element 12 would be provided.

While the embodiment in FIGS. 7 to 10 is designed as an adapter that can be screwed on, the installation could be provided in the filter head 4, as is shown accordingly for the embodiment in FIG. 6. In addition to its function as a contamination indicator, or alternatively thereto, the invention may also be provided as a protection device to protect pressure sensors or other pressure-sensitive devices from an overload in the case of a cold start.

While various embodiments have been chosen to illustrate the invention, it will be understood by those skilled in the art that various changes and modifications can be made therein without departing from the scope of the invention as defined in the claims.

The invention claimed is:

1. A contamination indicator for filter elements for fluids housed in a filter housing, comprising:
   a fluid-conveying connection in fluid communication with a filter housing interior;
   an indicating device providing information of degree of filter element contamination and having a fluid inlet; and
   a temperature-dependent active actuation device being connected upstream of said indicating device in a direction of said fluid inlet of said indicating device and activating said indicating device when a temperature of fluid being filtered has reached a predefinable threshold value, said actuation device including a valve having a movable closing body with a body longitudinal axis, said closing body being biased toward a closed position blocking said fluid inlet of said indicating device and being movable into an open position opening said fluid inlet of said indicating device by a temperature-dependent active positioning device associated with said valve, said positioning device having an expansion element with an element longitudinal axis being connected upstream of said closing body in the direction of said fluid inlet, coming into contact with the fluid and being coupled with said closing body such that said closing body is moved along said body longitudinal axis into the open position through thermal expansion of said expansion element in a direction along said element longitudinal axis applied mechanically to said closing body and in a direction of the thermal expansion of said expansion element, said closing body including a valve spool guided in a valve cylinder forming a part of and being in fluid communication with said fluid inlet, said valve spool being movable in a direction thereof to an open position thereof by the expansion of said expansion element in which said spool releases an outlet of said valve cylinder leading to said indicting device.

2. A contamination indicator according to claim 1 wherein said indicating device comprises a differential pressure indicator detecting a pressure differential at the filter element during operation, said pressure differential indicator being in fluid communication with a clean side and a dirty slide of the filter element with pressure at the dirty and clean sides acting on said pressure differential indicator.

3. A contamination indicator according to claim 1 wherein said indicating device comprises a back pressure indicator in fluid communication with a dirty side of the filter element via said actuation device, pressure of the dirty side of the filter element acting on said back pressure indicator counter to static ambient pressure.

4. A contamination indicator according to claim 1 wherein said expansion element comprises an expansion body having one side on said closing body and an opposite side on a stationary part of said valve.

5. A contamination indicator according to claim 1 wherein a valve block houses said valve cylinder of said actuation device and said indicating device, said valve block having inner fluid connections for respective fluid inlets of said indicating device and said actuation device.

6. A contamination indicator according to claim 5 wherein said valve block comprises a connecting port being threadable into a connecting bore of a head section of a filter housing, having an inner fluid passage and forming a fluid-conveying connection to an interior of the filter housing via the connecting bore of the head section, said inner fluid passage being formed as part of said fluid inlet of said actuation device.

7. A contamination indicator according to claim 1 wherein said valve of said actuation device comprises a valve seat abutted by said closing body along said body longitudinal axis under pretensioning of a closing spring.

8. A contamination indicator according to claim 7 wherein said valve seat is in a valve housing having a fluid passage defined by a stepped bore extending through said valve housing, said stepped bore having a step forming said valve seat, said closing body comprising a valve ball.

9. A contamination indicator according to claim 8 wherein said valve housing comprises a connection part being on an inlet said of said stepped bore and forming a fluid connection to the dirty side of the filter element; and
   said expansion element comprises an expansion spring of a metal alloy having shape memory in an end section of said stepped bore adjacent to said connection part, said expansion spring expanding to a greater length upon heating, being supported on one end on said connection part and transmitting a dynamic force on said valve ball against a closing force of said closing spring with another end of said expansion spring upon heating of said expansion spring.

10. A contamination indicator according to claim 9 wherein
   said stepped bore comprises a narrowed section between said valve seat and said expansion spring; and
   a tappet extends through said narrowed section, one end of said tapped abutting said valve ball, said tappet having an actuation part supporting said expansion spring.

11. A contamination indicator according to claim 10 wherein
   said expansion spring is in a widened bore segment of said stepped bore, said widened bore segment being widened compared to said narrowed section adjacent said valve seat and receiving and movably guiding said actuation part of said tappet.

12. A contamination indicator according to claim 8 wherein
   said closing spring comprises a compression spring in a spring bore section of said stepped bore extending from said valve seat to an outlet end of said valve housing, said outlet end having a threaded section threadedly receiving a hollow adjustment screw, said closing spring having one end engaging said adjacent screw and an opposite end engaging said valve ball.

13. A contamination indicator according to claim 1 wherein
   said expansion element comprises an axial expansion spring of a metal alloy having shape memory, said expansion spring extending along a longitudinal axis of said expansion spring to a greater length upon heating thereof and being supported on one side on said closing body and on an opposite side thereof on a stationary part of said valve.

14. A contamination indicator according to claim 1 wherein
   said body longitudinal axis and said element longitudinal axis are parallel to a longitudinal axis of a filter element located in a filter housing.

15. A contamination indicator according to claim 14 wherein
   said body longitudinal axis and said element longitudinal axis are offset relative to the longitudinal axis of the filter housing.

16. A contamination indictor according to claim 1 wherein fluid communication between an inlet of the filter housing and said indicating device is blocked in closing body in the closed position thereof.

17. A contamination indicator for filter elements for fluids housed in a filter housing, comprising:
   a fluid-conveying connection in fluid communication with a filter housing interior;
   an indicating device providing information of degree of filter element contamination and having a fluid inlet; and
   a temperature-dependent active actuation device being connected upstream of said indicating device in a direction of said fluid inlet of said indicating device and activating said indicating device when a temperature of fluid being filtered has reached a predefinable threshold value, said actuation device including a valve having a movable closing body with a body longitudinal axis, said closing body being biased toward a closed position blocking said fluid inlet of said indicating device and being movable into an open position opening said fluid inlet of said indicating device by a temperature-dependent active positioning device associated with said valve, said positioning device having an expansion element with an element longitudinal axis being connected upstream of said closing body in the direction of said fluid inlet, coming into contact with the fluid and being coupled with said closing body such that said closing body is moved along said body longitudinal axis into the open position through thermal expansion of said expansion element in a direction along said element longitudinal axis applied mechanically to said closing body and in a direction of the thermal expansion of said expansion element, said valve seat being in a valve housing having a fluid passage defined by a stepped bore extending axially through said valve housing, said stepped bore having a step forming said valve seat, said closing body comprising a valve ball, said valve housing including a connection part being on an inlet said of said stepped bore and forming a fluid connection to the dirty side of the filter element, said expansion element including an expansion spring of a metal alloy having shape memory in an end section of said stepped bore adjacent to said connection part, said expansion spring expanding to a greater length upon heating, being supported on one end on said connection part and transmitting a dynamic force on said valve ball against a closing force of said closing spring with another end of said expansion spring upon heating of said expansion spring.

18. A contamination indicator for filter elements for fluids housed in a filter housing, comprising:
   a fluid-conveying connection in fluid communication with a filter housing interior;
   an indicating device providing information of degree of filter element contamination and having a fluid inlet; and
   a temperature-dependent active actuation device being connected upstream of said indicating device in a direction of said fluid inlet of said indicating device and activating said indicating device when a temperature of fluid being filtered has reached a predefinable threshold value, said actuation device including a valve having a movable closing body with a body longitudinal axis, said closing body being biased toward a closed position blocking said fluid inlet of said indicating device and being movable into an open position opening said fluid inlet of said indicating device by a temperature-dependent active positioning device associated with said valve, said positioning device having an expansion element with an element longitudinal axis being connected upstream of said closing body in the direction of said fluid inlet, coming into contact with the fluid and being coupled with said closing body such that said closing body is moved along said body longitudinal axis into the open position through thermal expansion of said expansion element in a direction along said element longitudinal axis applied mechanically to said closing body and in a direction of the thermal expansion of said expansion element, said valve of said actuation device including a valve seat axially abutted by said closing body along said body longitudinal axis under pretensioning of a closing spring, said valve seat being in a valve housing having a fluid passage defined by a stepped bore extending through said valve housing, said stepped bore having a step forming said valve seat, said closing body comprising a valve ball, said closing spring including a compression spring in a spring bore section of said stepped bore extending from said valve seat to an outlet end of said valve housing, said outlet end having a threaded section threadedly receiving a hollow adjustment screw, said closing spring having one end engaging said adjacent screw and an opposite end engaging said valve ball.

19. A contamination indicator for filter elements for fluids housed in a filter housing, comprising:
   a fluid-conveying connection in fluid communication with a filter housing interior;
   an indicating device providing information of degree of filter element contamination and having a fluid inlet; and
   a temperature-dependent active actuation device being connected upstream of said indicating device in a direction of said fluid inlet of said indicating device and activating said indicating device when a temperature of fluid being filtered has reached a predefinable threshold value, said actuation device including a valve having a movable closing body with a body longitudinal axis, said closing body being biased toward a closed position blocking said fluid inlet of said indicating device and being movable into an open position opening said fluid inlet of said indicating device by a temperature-dependent active positioning device associated with said valve, said positioning device having an expansion element with an element longitudinal axis being connected upstream of said closing body in the direction of said fluid inlet, coming into contact with the fluid and being coupled with said closing body such that said closing body is moved along said body longitudinal axis into the open position through thermal expansion of said expansion element in a direction along said element longitudinal axis applied mechanically to said closing body and in a direction of the thermal expansion of said expansion element, said expansion element including an expansion spring of a metal alloy having shape memory, said expansion spring extending axially along a longitudinal axis of said expansion spring to a greater length upon heating thereof and being supported on one side on said closing body and on an opposite side thereof on a stationary part of said valve.

* * * * *